(12) United States Patent
Soumare

(10) Patent No.: US 8,738,353 B2
(45) Date of Patent: May 27, 2014

(54) RELATIONAL DATABASE METHOD AND SYSTEMS FOR ALPHABET BASED LANGUAGE REPRESENTATION

(76) Inventor: Modibo Soumare, Minnetonka, MN (US)

( * ) Notice: Subject to any disclaimer, the term of this patent is extended or adjusted under 35 U.S.C. 154(b) by 1262 days.

(21) Appl. No.: 11/899,223

(22) Filed: Sep. 5, 2007

(65) Prior Publication Data

US 2009/0063131 A1   Mar. 5, 2009

(51) Int. Cl.
*G06F 17/20* (2006.01)
(52) U.S. Cl.
USPC .................. 704/1; 704/4; 707/688; 707/737
(58) Field of Classification Search
USPC ........................................................ 704/1–10
See application file for complete search history.

(56) References Cited

U.S. PATENT DOCUMENTS

| | | | | |
|---|---|---|---|---|
| 4,980,829 A * | 12/1990 | Okajima et al. | ................... | 704/5 |
| 5,068,789 A | 11/1991 | van Vliembergen | | |
| 5,386,556 A | 1/1995 | Hedin et al. | | |
| 5,477,450 A * | 12/1995 | Takeda et al. | ..................... | 704/2 |
| 5,612,872 A * | 3/1997 | Fujita | ............................... | 704/2 |
| 5,844,798 A * | 12/1998 | Uramoto | ........................... | 704/2 |
| 6,167,369 A * | 12/2000 | Schulze | ............................ | 704/9 |
| 6,850,930 B2 | 2/2005 | Shetty | | |
| 7,047,288 B2 | 5/2006 | Cooper et al. | | |
| 7,058,564 B2 | 6/2006 | Ejerhed | | |
| 7,149,681 B2 * | 12/2006 | Hu et al. | ........................... | 704/2 |
| 2002/0013694 A1 * | 1/2002 | Murata et al. | ...................... | 704/9 |
| 2002/0091509 A1 * | 7/2002 | Zoarez et al. | ...................... | 704/6 |
| 2004/0102956 A1 * | 5/2004 | Levin | ................................ | 704/2 |
| 2004/0122658 A1 * | 6/2004 | Lamping et al. | ................... | 704/9 |
| 2004/0167771 A1 * | 8/2004 | Duan et al. | ....................... | 704/10 |
| 2006/0067508 A1 * | 3/2006 | Basson et al. | ............ | 379/265.12 |
| 2007/0083359 A1 * | 4/2007 | Bender | ............................. | 704/9 |
| 2008/0201229 A1 | 8/2008 | Metzman | | |

FOREIGN PATENT DOCUMENTS

WO   WO 2006/128123   11/2006

OTHER PUBLICATIONS

International Search Report, PCT/US2008/010127, Filing Date Aug. 27, 2008, Applicant, Modibo Soumare.
Arnold, "Machine Translation: an Introductory Guide", Aug. 21, 2007, pp. 105-122.
Greenberg, "Universals of Language", 1963, pp. 73-113.

* cited by examiner

*Primary Examiner* — Jialong He
(74) *Attorney, Agent, or Firm* — Kinney & Lange, P.A.

(57) ABSTRACT

A method of representing a language statement having one or more words includes capturing an expression of the language statement, associating one or more properties with each of the one or more words in the language statement, substantially removing as necessary one or more first ambiguities in the language statement, establishing one or more functional roles for each of the one or more words in the language statement, processing as necessary one or more second ambiguities in the language statement, and providing a representation of the language statement including the one or more properties associated with and the one or more functional roles established for each of the one or more words, the one or more first ambiguities substantially removed, and the one or more second ambiguities processed.

21 Claims, 3 Drawing Sheets

RELATIONAL DATABASE METHOD AND SYSTEMS FOR ALPHABET BASED LANGUAGE REPRESENTATION

BACKGROUND

The present invention relates to methods and systems for representing natural language statements.

Methods and systems directed at communicating across different natural languages, for example French and English or Spanish and Italian, are well known. One commonly known system is a language translator, such as Babblefish (babelfish<dot>altavista<dot >com) or Google's translator (www<dot>google<dot>com/language_tools). However, prior language systems, such as language translators, have many disadvantages. One such disadvantage of prior systems is their inability to robustly process semantic versus literal meaning. For example, prior systems commonly translate statements from one language to another by providing a literal translation, i.e. a word-by-word translation of the statement. Unfortunately, literal translations often yield significant errors in meaning because they fail to account for the semantics of the statement as a whole and how semantic meaning translates from one language to another. In general, prior systems have failed to provide a means for representing language statements in a form, which is generic to language type and accounts for, for example, semantics, the functional roles of each of the words in the language statement, and common ambiguities, such as idioms, functional incongruities, and anthropomorphic constructions.

SUMMARY

The present invention includes a method of representing a language statement having one or more words, which method includes capturing an expression of the language statement, associating one or more properties with each of the one or more words in the language statement, substantially removing as necessary one or more first ambiguities in the language statement, establishing one or more functional roles for each of the one or more words in the language statement, processing as necessary one or more second ambiguities in the language statement, and providing a representation of the language statement including the one or more properties associated with and the one or more functional roles established for each of the one or more words, the one or more first ambiguities substantially removed, and the one or more second ambiguities processed.

Embodiments of the present invention also include a system for representing one or more language statements each including one or more words, which system includes at least one computer including one or more software components. The software components are configured to capture an expression of a language statement, associate one or more properties with each of the one or more words in the language statement, substantially remove as necessary one or more first ambiguities in the language statement, establish one or more functional roles for each of the one or more words in the language statement, identify as necessary one or more second ambiguities in the language statement, and provide a representation of the language statement including the one or more functional roles for each of the one or more words, the one or more first ambiguities substantially removed, and the one or more second ambiguities identified.

DETAILED DESCRIPTION

Figure 1:
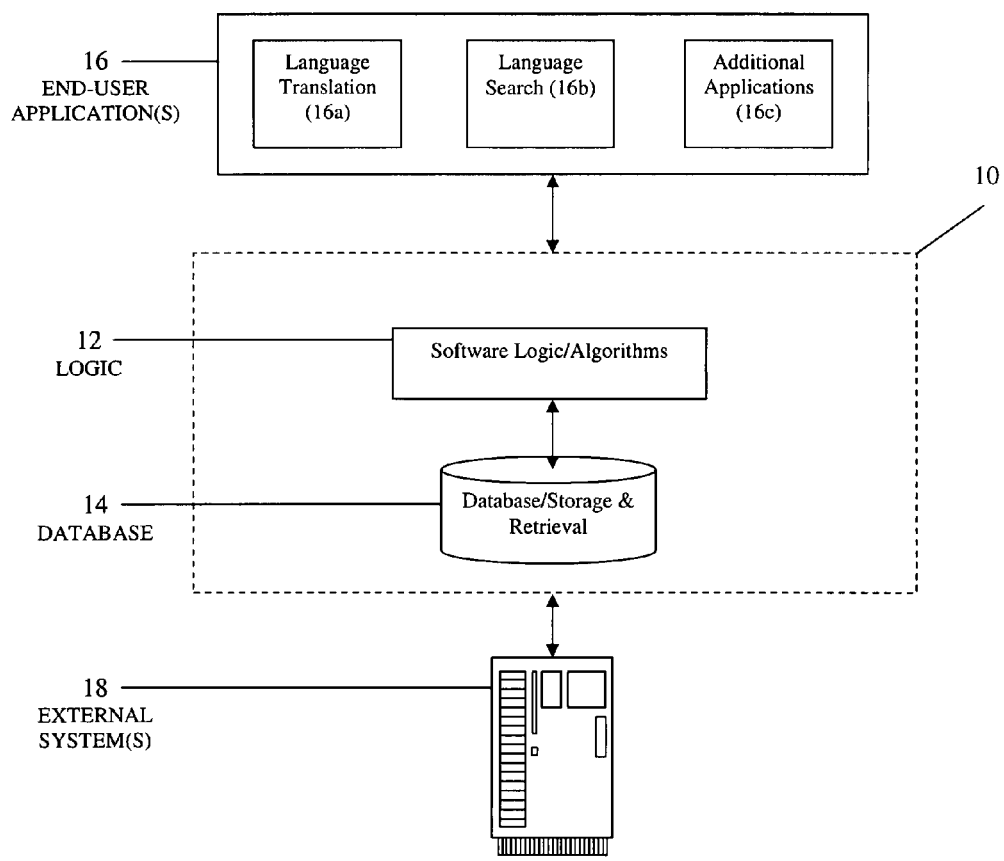
FIG. 1 is an architectural diagram illustrating an electronic language representation system according to the present invention.

FIG. 1 is an architectural diagram illustrating electronic language representation system 10 according to the present invention, which system includes logic layer 12 and database layer 14. System 10 includes logic layer 12, which may include one or more software programs, components, stored procedures, etc. configured to provide representations of natural language statements entered by users of system 10. Communicating data necessary for system 10 to and from logic layer 12, and in some embodiments to end-user applications 16, is database layer 14. Database layer 14 may include off-the-shelf or proprietary databases or any other storage and retrieval mechanisms appropriate for use with system 10. Language representation system 10 may be a stand-alone system configured to carry out methods according to the present invention (described in detail with reference to FIG. 2 below) for processing language statements entered by users and providing representations of the language statements, such as storing a representation of a language statement entered by a user and processed by logic layer 12 in database layer 14. Alternatively, system 10 may be configured to interface with one or more end-user applications 16, such as language translation application 16a and language search application 16b, as well as additional applications 16c appropriate for use with system 10. For example, a user may access language translation application 16a to enter one or more language statements in one or more language types, such as English, French, Spanish, and Italian. Using translation application 16a, the user may specify a source language type of English, enter a statement in English, and request the statement be translated to French. Translation application 16a communicates the statement entered to logic layer 12 of system 10, which in turn processes the language statement and communicates with database layer 14 as necessary to provide a representation of the language statement. Logic layer 12 communicates the representation of the statement to translation application 16a, which translates the representation of the statement from English to French. Translation application 16a presents the user with the statement translation in French by, for example, displaying the translated statement on a terminal used by the user. Additional applications 16c appropriate for use with system 10 may include, for example, knowledge farm applications and language data mining applications. System 10 may also include communication interfaces to external systems 18, which may include one or more electronic systems external to system 10, such as an external electronic dictionary of words in one or more language types.

Figure 2:
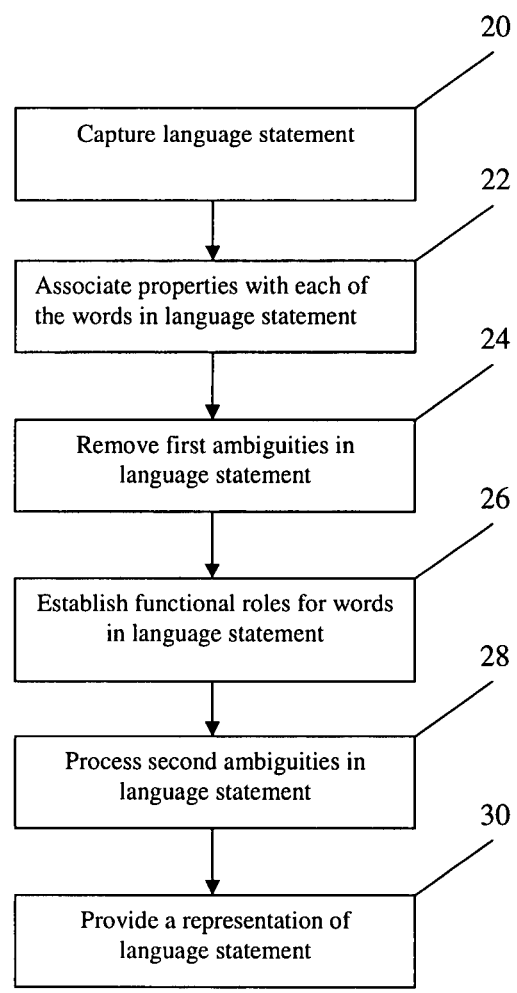
FIG. 2 is a flow chart illustrating functions carried out by the language representation system illustrated in FIG. 1.

FIG. 2 is a flow chart illustrating functions carried out by language representation system 10 shown in FIG. 1, which include capturing an expression of a language statement (20), associating one or more properties with each of the one or more words in the language statement (22), substantially removing as necessary one or more first ambiguities in the language statement (24), establishing one or more functional roles for each of the one or more words in the language statement (26), identifying as necessary one or more second ambiguities in the language statement (28), and arriving at a representation of the language statement including the one or more functional roles for each of the one or more words, the one or more first ambiguities substantially removed, and the one or more second ambiguities processed (30).

Capturing an expression of the language statement (20) may include ending the language statement by adding a statement end identifier, processing non-alphanumeric characters included in the language statement, separating sentences included in the language statement, and identifying or deducing a source language type for the language statement. By way of a specific example, a user may access system 10 by entering a language statement on user terminal 28. The user may, for example, enter the language statement into an interactive software interface, identify a location for system 10 to retrieve a language statement, such as a URL or other file location, or input a voice based expression of the language statement. In the case the user of system 10 accesses an interactive software interface, the user may access, for example, a web based interface running in a standard web browser, such as Microsoft Explorer, Netscape, Navigator, or Mozilla's Firefox, and enter the language statement in one or more language types.

After the user enters the language statement, system 10 may then analyze the language statement to determine if the statement includes an end identifier, such as a period. In the case the statement does not include an end identifier, system 10 may add, for example, a period (".") at the end of the language statement. System 10 may also process non-alphanumeric characters contained in the language statement by, for example, identifying characters such as !, ?, :, ;, >, <, /, -, +, =, _, ', ~, @, #, $, %, ^, & , *, (, ), {, }, [, and \ and adding a space before and after each non-alphanumeric character identified. Processing non-alphanumeric characters may also include replacing sentence ending characters other than periods, such as exclamation points ("!") or question marks ("?"), with the character followed by a space, a period, and a space after the period. For example, "?" included in or at the end of the language statement may be replaced by "?.". In addition to processing non-alphanumeric characters, system 10 may separate one or more sentences included in the language statement by, for example, identifying sentence ending punctuation and separating the group of one or more words preceding such punctuation. The word "sentence" as used herein includes one or more words included in the language statement, grouped by proximity to one another, and preceding a common sentence ending non-alphanumeric character, such as a period ("."), question mark ("?"), or exclamation point ("!"). A sentence may or may not form a grammatically correct and complete combination of words. In the above example where sentence ending characters have been replaced by the character followed by a space, a period, and a space after the period, sentences may be efficiently separated by separating each group of one or more words preceding a period.

In addition to separating sentences in the language statement, system 10 may identify or deduce a source language type for the language statement. In some embodiments of the present invention, the software interface through which the user enters the language statement may require the user to select a source language type for the language statement entered. For example, the user types the language statement into a text box and selects the source language type as "English" from a drop-down list of possible language types. In other embodiments of the present invention, system 10 may be configured to deduce the source language type. The language statements entered by users of system 10 may be expressed in one or more language types. For example, the user may enter the language statement primarily in English but may also include one or more French words or phrases.

Deducing a source language type may include classifying each word by language type, and assigning a source language type to the language statement by checking language type continuity between one or more words in the language statement. Assigning a source language type may be accomplished by, for example, checking language type continuity between subjects and verbs, between nouns, between verbs, between pronouns, and between words other than subjects, verbs, nouns, and pronouns in the language statement.

Functions carried out by language representation system 10 also include associating one or more properties with each of the one or more words in the language statement (22), which may include identifying a match for each of the one or more words in the language statement from a list of words and assigning one or more properties associated with each of the matched words to each of the one or more words in the language statement. As discussed with reference to FIG. 1, system 10 may include database layer 14 to which data is stored and from which data may be searched and retrieved by system 10. Database layer 14 of system 10 may include a database record, or records, including a list of words in one or more language types, for example English and French. System 10 may associate properties with each of the words in the language statement (22) by, for example, matching each word from the statement with a word stored in the records of database layer 14. System 10 may identify an exact or phonetic match for the words in the statement. After identifying a match for each of the words, system 10 may assign one or more properties associated with the matched words in the database to each of the words in the language statement. The properties assigned to each of the words in the language statement may include, for example, word classification, grammar type, person, gender, and tense. The word property "classification" may include, for example, values such as person, animal, or thing. The value "thing" for the word property "classification" may include things created by humans or things existing in the natural universe. Word properties, such as classification, may be used by system 10 to resolve ambiguities in language statements, such as a sentence containing anthropomorphic constructions. For example, the user may enter the statement "the car dances." System 10 may identify that the word "car" is a noun with a word classification of thing, while the verb "dance" is associated with nouns with a classification of person, or, in some cases, animal. In this case, system 10 may, for example, log an error due to the subject-verb ambiguity in the statement entered by the user. Alternatively, system 10 may attempt to remove the ambiguity by prompting the user to clarify or validate the word classifications assigned by system 10. For example, system 10 may alert the user of the subject-verb ambiguity and the user may clarify that the word "car" should be assigned the classification of "person," which classification may be associated with the verb "dance." In the event system 10 does not identify an exact or phonetic match for a word, the word may be assigned a default set of properties, for example, an unmatched word may be assigned classification person, grammar type proper-noun, person third-person, and gender masculine.

In addition to associating properties with the words in the language statement (22), system 10 substantially removes as necessary one or more first ambiguities in the language statement (24). Removing a first set of ambiguities in the language statement (24) may include separating as necessary one or more sentences included in the language statement and processing as necessary one or more idioms in each of the one or more sentences based on word proximity. If it has not already been done upon capturing the language statement (20), system 10 may separate sentences included in the language statement by, for example, identifying sentence ending punctuation and separating the group of one or more words preceding such punctuation. After separating the sentences in the language statement, system 10 may process idioms in each of the sentences by word proximity. Idioms processed by system 10 may include semantic idioms, grammatical idioms, and phrasal verbs and may be processed by, for example, identifying idioms in each of the sentences based on word proximity and transforming the idioms into non-idiomatic phrases or words. For example, the user may enter a language statement including the sentence "John won't abide by the rules." The contraction "won't" is a grammatical idiom, and the phrase "abide by" is a phrasal verb. System 10 may identify both idioms in the sentence by referencing a database record, or records, including known idiomatic words or phases and each idioms non-idiomatic equivalent. For example, system 10 may identify "won't" and "abide by" in a database of known idioms and transform "John won't abide by the rules" to "John will not follow the rules."

System 10 also establishes one or more functional roles for each of the one or more words in the language statement (26). Establishing functional roles for the words in the language statement (26) may include separating sentences included in the language statement, assigning functional roles to each of the words in each of the sentences, and generating a functional specification of the language statement. Again, if it has not already been done, system 10 may separate sentences included in the language statement by, for example, identifying sentence ending punctuation and separating the group of one or more words preceding such punctuation. System 10 may assign functional roles to each of the words in each of the sentences by, for example, analyzing the properties of each word and the relative proximity of each word in each sentence. In some embodiments of the present invention, system 10 may also prompt the user to validate the functional roles assigned to each of the words in each of the sentences. The functional roles assigned to each word may include complement-object-indirect, complement-object-direct, determinative-complement, noun-attribute, noun-complement, orphan-attribute, orphan-noun, orphan-verb, subject, verb, and verb-attribute. System 10 may assign functional roles by, for example, first checking the grammar type of each word to identify nouns, verbs, pronouns, articles, etc. Within a single sentence, system 10 may identify only one noun and one verb, in which case system 10 may assign the noun the functional role of subject and the verb the functional role of verb. Alternatively, system 10 may identify several nouns in which case system 10 may then check other word properties, such as classification, and the proximity of each of the nouns to other words in the sentence in order to assign each of the nouns a functional role. For example, the user may enter a language statement including the sentence "John walked down the street." System 10 may identify "John" and "street" both as nouns. However, system 10 may assign "John" the functional role of subject by analyzing other properties of each of the words and by the proximity of "John" to other words. For example, the word "John" is immediately followed by the only verb in the sentence, "walked." Additionally, "walked" may be a verb associated with, in general, nouns having a classification of person or animal, which would match the classification for "John" but not "street." Finally, the second noun "street" is located at the end of the statement and is preceded by a preposition. Therefore, system 10 may assign "John" the functional role of subject, "walked" the role of verb, "the" the role of noun-attribute, and "street" the role of complement-object-indirect. After assigning each of the words a functional role, system 10 may generate a functional specification of the language statement. For example, system 10 may store each of the words grouped into sentences in a database record, or records, which also associates each word with one or more properties and functional roles.

In addition to establishing functional roles for the words in the language statement (26), system 10 identifies a second set of ambiguities in the language statement (28). Identifying the second ambiguities may include separating sentences included in the language statement, establishing, functional relationships between the words in each of the sentences or between two or more sentences, identifying the second ambiguities between the words in each of the sentences or between two or more sentences, and removing one or more of the second ambiguities. After separating the sentences included in the language statement, system 10 establishes functional relationships between words in a sentence or between two or more sentences. Establishing functional relationships between words may include associating one or more words with other words based on word properties, functional roles, and word proximity. For example, the user may enter a language statement including the sentences "John walked down the street" and "He won't abide by the rules." By establishing functional relationships between the words in each sentence and between the two sentences, system 10 may, for example, establish that the actor in both sentences is John and therefore the pronoun "he" should be functionally related to "John." In this example, system 10 may also substantiate the relationship between "John" and "he" by establishing that the word classification, person, and gender properties are the same for both words.

After establishing functional relationships, system 10 identifies the second ambiguities between the words in a sentence or between two or more sentences. The ambiguities identified may include, for example, functional, semantic, and grammatical ambiguities. The user may, for example, enter a language statement including the sentences "John walked down the street" and "She won't abide by the rules." System 10 may identify an ambiguity, because "John" has a masculine gender and the pronoun "she" potentially functionally related to "John" has a feminine gender. System 10 may identify many other types of ambiguities. For example, system 10 may identify a semantic ambiguity in the sentence "The car will eat the road," because the verb, eat, is incongruent with the classification of the subject, car, or in other words, "things" do not "eat." In a similar example, system 10 may identify a semantic ambiguity in the sentence "The man eats the table," because the classification of the object, table, is incongruent with the verb, eat, or in other words, one does not "eat" a "table." The sentences "The car will eat the road" and "The man eats the table" are both examples of noun-verb semantic ambiguities. System 10 may identify several other types of ambiguities including subject-verb grammar ambiguities, such as "The cars drives very well;" verb tense grammar ambiguities, such as "I did drive the car tomorrow;" participle grammar ambiguities, such as "I am impress by the teacher;" incomplete sentence grammar ambiguities, such as "My brother;" and article-noun grammar ambiguities, such as "These car drives very well."

After identifying the second ambiguities, system 10 removes one or more of the second ambiguities. Some ambiguities may not be appropriately removed by system 10 without user interaction. For example, the incongruence between the noun-subject "John" and the pronoun "she" in the two sentences "John walked down the street" and "She won't abide by the rules" may not indicate an entry error by the user. The two sentences may be unrelated and the actor associated with the pronoun "she" may simply be unidentified. Alternatively, the proper noun "John" may be a woman, or for that matter, a female cat. In cases where the ambiguity may not be automatically removed, system 10 may retain a log of ambiguities identified, for example by storing ambiguities in a database record, or records, and prompt the user to clarify one or more words in the language statement to remove one or more of the ambiguities identified. In other cases, for example cases involving noun-complement and determinative-complement ambiguities, system 10 may automatically remove one or more of the second ambiguities. System 10 may remove one or more noun-complement and determinative-complement ambiguities by, for example, identifying nouns complement by the noun-complements and determinative-complements, checking for semantic congruence between each of the complemented and the noun-complements and determinative-complements, and replacing as necessary one or more properties of the one or more nouns complements by the noun-complements and determinative-complements. For example, the user enters a language statement including the phrase "the foundation address . . . " System 10 may establish that the relationship between the noun "foundation" and the noun-complement "address" creates an ambiguity in the statement entered by the user, because the noun-complement "address" is not ordinarily associated with a "foundation" classified as a structure. System 10 may check for semantic congruence between "address" and "foundation" by, for example, referencing a database record, or records, of known hyponyms of the noun "foundation." The noun "foundation" may, for example, include hyponyms describing the size, shape, weight, or other physical characteristics of the foundation. However, system 10 may determine that location is not a common hyponym of the noun "foundation." System 10 may also check for semantic congruence between "address" and "foundation" by, for example, referencing a database record, or records, of known hypernyms of the noun-complement "address." After checking for semantic congruence between the noun "foundation" and the noun-complement "address," system 10 may replace one or more properties of "foundation" in order to remove the ambiguity with the noun-complement "address." For example, system 10 may replace the classification of "foundation" as a thing-object-non-anthropomorphic with the classification thing-concept-organization, in other words, system 10 changes the classification of the noun "foundation" from a physical structure to a form of organization and thereby removes the ambiguity with the noun-complement "address."

In addition to identifying a second set of ambiguities in the language statement (28), system 10 provides a representation of the language statement (30). The representation of the language statement provided by system 10 (30) includes the properties associated with and the functional roles established for each of the words, the first ambiguities substantially removed, and the second ambiguities identified. For example, system 10 may store each of the words grouped into sentences in a database record, or records in database layer 14. The records stored in database layer 14 may also associate each word with one or more properties and functional roles. The sentences grouped together may include words or phrases transformed to remove ambiguities, such as semantic, grammatical, and phrasal-verb idioms. System 10 may associate the words grouped by sentences with one or more logs including ambiguities identified, but not removed by system 10, which logs are likewise stored in a record, or records in database layer 14. System 10 may also provide a representation of the language statement by, for example, presenting the statement representation to the user on user terminal 28, communicating the statement representation to an end-user application 16 such as language translation application 16a, or communicating with an output device such as a printer to provide a printed copy of the language statement representation.

Figure 3:
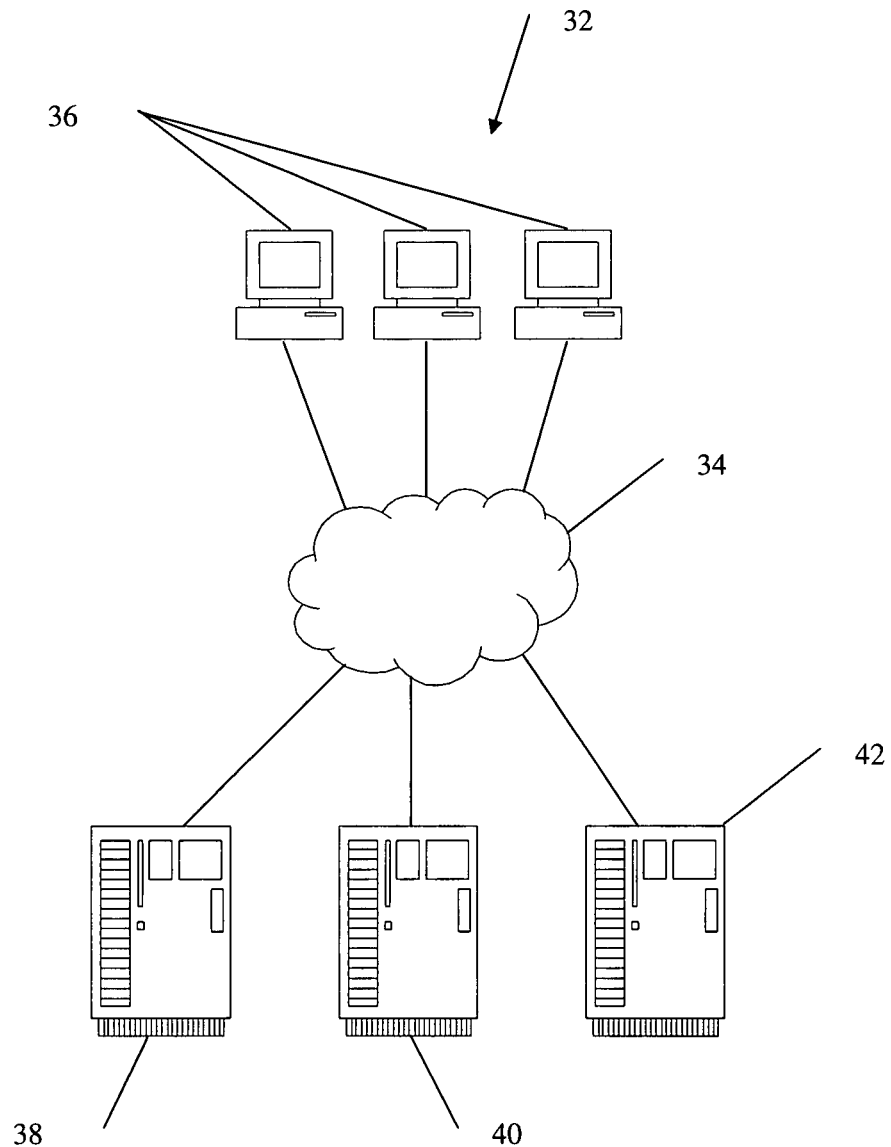
FIG. 3 is a schematic diagram illustrating a distributed computing network configured to store and process the language representation system illustrated in FIGS. 1 and 2.

Language representation system 10, and in some embodiments end-user applications 16 and external systems 18, may be stored and processed on a single computer or may be distributed across more than one computer. For example, FIG. 3 is a schematic diagram illustrating a distributed computing network 32 configured to store and process language representation system 10, end-user applications 16, and external systems 18. Computing network 32 includes network cloud 34, user terminals 36, first server 38, second server 40, and third server 42. Network cloud 34 may be a private or public network infrastructure, such as a corporate LAN or WAN or the Internet, configured to connect user terminals 36 and first, second, and third servers 38-42. Network cloud 34 may include wired and/or wireless connections configured to transmit data using one or more communications protocols, such as IP or ATM. Computing network 32 also includes user terminals 36 through which one or more users may access and use language representation system 10, and in some embodiments, end-user applications 16. User terminals 36 each may include, for example, a computer configured with an operating system, such as Windows, Macintosh, or LINUX, one or more monitors, and input devices, such as a keyboard and a mouse. Computing network 32 includes first, second, and third servers 38-42, which may be, for example, configured to store and process language representation system 10, end-user applications 16, and external systems 18 respectively.

Methods and systems according to the present invention have several advantages over prior language communication methods and systems. Embodiments of the present invention provide methods and systems for representing language statements in a form, which is generic to language type and which accounts for statement semantics, the functional roles of words in the statement, and identifies and/or removes ambiguities, such as idiomatic words or phrases, functional incongruities within one sentence or across more than one sentence, and anthropomorphic constructions. Language representation systems and methods according to the present invention also provide a framework for interactive language representation, which allows users to clarify, validate, and change statement meaning by, for example, clarifying, validating, and changing properties associated with and functional roles established for words in the language statement. Embodiments of the present invention therefore make possible substantially more accurate communication across language types by encoding semantic, grammatical, and functional meaning in a language statement representation independent from the language type in which the statement is expressed and to which the statement may be, for example, translated.

Although the present invention has been described with reference to preferred embodiments, workers skilled in the art will recognize that changes may be made in form and detail without departing from the spirit and scope of the invention.

The invention claimed is:

1. A method of representing a language statement having one or more words, the method comprising:
    capturing an expression of the language statement in a digital database;
    electronically associating each word in the language statement with at least one word database record from the digital database, the word database record having a plurality of properties including person, gender, tense, part of speech, and semantic word classification;

substantially removing with a computer any first ambiguities as to which word database record corresponds to each word in the language statement;

establishing one or more functional roles for each word in the language statement, wherein the functional roles are categories comprising at least one of complement-object-indirect, complement-object-direct, determinative-complement, noun-attribute, noun-complement, orphan-attribute, orphan-noun, orphan-verb, subject, verb, and verb-attribute, and the functional roles are determined by the context of the words within the language statement, and by the properties of the word database record associated with the word in the language statement;

processing any second ambiguities in the language statement with a computer, using the functional roles and the properties, the second ambiguities selected from a group of ambiguities comprising functional, semantic, and grammatical incongruities between the words in the language statement; and providing a representation of the language statement as database records, the representation including the properties of the word database records associated with each word in the language statement, and the functional roles established for each word in the language statement, and wherein which the first ambiguities are substantially removed, and the second ambiguities are processed.

2. The method of claim 1, wherein capturing an expression of the language statement in digital memory comprises:

ending the language statement by adding a statement end identifier;

processing with a digital database stored procedure one or more non-alphanumeric characters included in the language statement;

separating one or more sentences included in the language statement; and deducing a source language type for the language statement.

3. The method of claim 2, wherein deducing a source language type for the language statement comprises:

identifying a language type for each of the one or more words in the language statement; and assigning a source language type to the language statement by checking language type continuity between one or more words in the language statement.

4. The method of claim 1, wherein electronically associating word in the language statement with at least one word database record comprises:

identifying at least one match for each word in the language statement with a word database record from the digital database.

5. The method of claim 1, wherein substantially removing first ambiguities comprises:

separating one or more sentences included in the language statement; and processing one or more idioms in each of the one or more sentences based on word proximity, functional role, and classification property.

6. The method of claim 5, wherein processing one or more idioms in each of the one or more sentences based on word proximity, functional role, and classification property comprises:

identifying one or more idioms in each of the one or more sentences based on word proximity, functional role, and classification property; and transforming the one or more idioms identified into one or more non-idiomatic phrases or words.

7. The method of claim 6, wherein the one or more idioms identified are selected from a group of idioms comprising semantic idioms, grammatical idioms, and phrasal verbs.

8. The method of claim 1, wherein establishing one or more functional roles for each word in the language statement comprises:

separating sentences included in the language statement;

assigning one or more functional roles to each word in each sentence of the language statement; and generating a functional representation of the language statement, the functional representation comprising the properties of each word database record corresponding to a word in each sentence, and the functional roles of each word in each of sentence.

9. The method of claim 1, wherein establishing the one or more functional roles further comprises analyzing the relative proximity of each word in the language statement.

10. The method of claim 1, wherein processing any second ambiguities in the language statement comprises:

separating sentences included in the language statement;

establishing functional relationships where appropriate between two or more words in the sentences, or between two or more of the sentences in the language statement;

identifying the one or more second ambiguities between the two or more words in the sentences, or between two or more of the sentences in the language statement; and substantially removing at least one of the second ambiguities.

11. The method of claim 10, wherein substantially removing at least one of the second ambiguities comprises substantially removing at least one noun- complement or determinative-complement ambiguity.

12. The method of claim 11, wherein substantially removing at least one noun-complement or determinative-complement ambiguity comprises:

identifying at least one noun complemented by at least one noun-complement or determinative-complement;

checking for semantic congruence between the at least one noun complemented and the at least one noun-complement or determinative-complement; and replacing one or more properties of the noun complemented by the at least one noun-complement or determinative-complement.

13. The method of claim 1 further comprising:

associating each word database record with an expression in a natural language; and translating the language statement into the natural language by outputting the expressions corresponding to the representation of the language statement.

14. The method of claim 1 further comprising:

searching one or more records for one or more portions of the language statement representation; and providing an output based on the search of the one or more records for one or more portions of the language statement representation.

15. A system for representing one or more language statements each including one or more words, the system comprising:

at least one computer including one or more software components configured to:

capture an expression of a language statement in a database;

associate words in the language statement with word database records having a plurality of properties including person, gender, tense, part of speech, and semantic classification;

substantially remove as necessary one or more first ambiguities in the language statement as to which word database record corresponds to each word in the language statement;

establish one or more functional roles for each of the one or more words in the language statement, wherein the functional roles are categories comprising at least one of complement-object-indirect, complement-object-direct, determinative-complement, noun-attribute, noun-complement, orphan-attribute, orphan-noun, orphan-verb, subject, verb, and verb-attribute, and the functional roles are determined by the context of each word within the language statement, and by the properties of the word database record associated with each word in the language statement;

identify as necessary one or more second ambiguities in the language statement using the functional roles and the properties, wherein the second ambiguities selected from a group of ambiguities comprising functional, semantic, and grammatical incongruities between the words in the language statement; and provide a representation of the language statement as database records, the representation including the properties of the word database records associated with each word in the language statement, and the functional roles for established for each of the one or more words, wherein the first ambiguities are substantially removed, and the second ambiguities are identified.

16. The system of claim 15, wherein associating one or more properties with each of the one or more words in the language statement comprises:

identifying at least one match for each word in the language statement with a word database record from a database.

17. The system of claim 15, wherein substantially removing as necessary one or more first ambiguities in the language statement comprises:

separating one or more sentences included in the language statement; and processing one or more idioms in each of the one or more sentences based on word proximity, functional role, and classification property.

18. The system of claim 17, wherein processing one or more idioms in each of the one or more sentences based on word proximity, functional role, and classification comprises:

identifying one or more idioms in each of the one or more sentences based on word proximity, functional role, and classification; and transforming the one or more idioms identified into one or more non-idiomatic phrases or words.

19. The system of claim 15, wherein establishing one or more functional roles for each of the one or more words in the language statement comprises:

separating sentences included in the language statement;

assigning one or more functional roles to each word in each sentence of the language statement; and generating a functional representation of the language statement, the functional representation comprising the properties of each word database record corresponding to a word in each sentence, and the functional roles of each word in each of sentence.

20. The system of claim 15, wherein identifying as necessary one or more second ambiguities in the language statement comprises:

separating sentences included in the language statement;

establishing functional relationships where appropriate between two or more words in the sentences, or between two or more of the sentences in the language statement;

identifying the one or more second ambiguities between the two or more words in the sentences, or between two or more of the sentences in the language statement; and substantially removing at least one of the one or more second ambiguities.

21. A system for representing one or more language statements each including at least one word, the system comprising:

a computer including a software component configured to:

capture an expression of a language statement;

associate each word in the language statement with at least one word database record having a plurality of properties including person, gender, tense, part of speech, and semantic classification;

substantially remove ambiguities as to which word database record corresponds to each word in the language statement;

establish a functional role for each word in the language statement based on the context of each word within the language statement, and the properties of the word database record associated with each word in the language statement, the functional role comprising at least one context dependent category selected from the group comprising complement-object-indirect, complement-object-direct, determinative-complement, noun-attribute, noun-complement, orphan-attribute, orphan-noun, orphan-verb, subject, verb, and verb-attribute;

identify further ambiguities in the language statement, as necessary, using the functional roles and the properties, wherein the second ambiguities are selected from a group comprising functional, grammatical, and semantic incongruities between the words in the language statement; and provide a representation of the language statement as database records, the representation including the functional roles for each word in the language statement, and the properties of the word database records associated with each word in the languages statement.

* * * * *